United States Patent
Sharma

(10) Patent No.: US 8,170,594 B1
(45) Date of Patent: May 1, 2012

(54) METHOD AND COMPUTER-READABLE MEDIUM FOR PRECEDENCE GROUP CALLING

(75) Inventor: Manish Sharma, Fairfax, VA (US)

(73) Assignee: Nextel Communications, Inc., Reston, VA (US)

( * ) Notice: Subject to any disclaimer, the term of this patent is extended or adjusted under 35 U.S.C. 154(b) by 1038 days.

(21) Appl. No.: 11/500,370

(22) Filed: Aug. 8, 2006

(51) Int. Cl.
*H04B 7/00* (2006.01)
*H04M 3/42* (2006.01)

(52) U.S. Cl. .................... 455/518; 379/208.01

(58) Field of Classification Search .............. None
See application file for complete search history.

(56) References Cited

U.S. PATENT DOCUMENTS

| | | | | |
|---|---|---|---|---|
| 5,631,904 A * | 5/1997 | Fitser et al. | .................. | 370/261 |
| 5,634,197 A * | 5/1997 | Paavonen | .................. | 455/512 |
| 5,666,364 A * | 9/1997 | Pierce et al. | .................. | 370/455 |
| 5,682,419 A * | 10/1997 | Grube et al. | .................. | 455/450 |
| 6,129,604 A * | 10/2000 | Maveddat et al. | .................. | 455/453 |
| 6,229,888 B1 * | 5/2001 | Miloslavsky | .................. | 379/265.01 |
| 6,480,833 B2 * | 11/2002 | Kaneko et al. | .................. | 707/2 |
| 6,484,037 B1 * | 11/2002 | Schmidt et al. | .................. | 455/514 |
| 6,516,200 B1 * | 2/2003 | Schmidt et al. | .................. | 455/518 |
| 6,763,243 B2 * | 7/2004 | Wolf et al. | .................. | 455/519 |
| 2002/0091783 A1 * | 7/2002 | Garland et al. | .................. | 709/207 |
| 2002/0196781 A1 * | 12/2002 | Salovuori | .................. | 370/352 |
| 2004/0137881 A1 * | 7/2004 | Pesonen | .................. | 455/414.1 |
| 2004/0190496 A1 * | 9/2004 | Albal et al. | .................. | 370/352 |
| 2005/0197146 A1 * | 9/2005 | Rao et al. | .................. | 455/519 |
| 2006/0008065 A1 * | 1/2006 | Longman et al. | .................. | 379/158 |
| 2007/0049314 A1 * | 3/2007 | Balachandran et al. | .................. | 455/518 |

* cited by examiner

*Primary Examiner* — Duc Nguyen
*Assistant Examiner* — Ayodeji Ayotunde

(57) ABSTRACT

A method and computer-readable medium for precedence group calling in a dispatch station is provided. The method includes: receiving a precedence order for each of a plurality of group call originators, based upon a group call identifier of each of the plurality of group call originators; receiving a new group call from one of the plurality of group call originators; and automatically switching the dispatch station from a current group call to the new group call, if the group call identifier of the originator of the new group call has a higher precedence than the group call identifier of the originator of the current group call.

25 Claims, 2 Drawing Sheets

METHOD AND COMPUTER-READABLE MEDIUM FOR PRECEDENCE GROUP CALLING

BACKGROUND OF THE INVENTION

The present invention relates to precedence group calling in a network. More specifically, the present invention provides a method and computer-readable medium for controlling group calling in a network, based upon a group call precedence order.

Wireless communications systems, such as cellular communication systems, typically provide interconnect and/or dispatch voice communication services. Interconnect voice communication services are those typically provided by most wireless carriers as circuit-switched communications. Dispatch communication services are commonly known as a push-to-talk (PTT) or walkie-talkie type of communication such as Sprint Nextel Corporation's service identified by the trade name Direct Connect. The popularity of dispatch calls is ever expanding and this increase in popularity has created a demand for more features for these types of calls.

Currently, dispatch communication services can provide private and group calls. A private dispatch call is between two parties, while a group dispatch call is between more than two parties, each of whom can converse with each of the other participants during the call. Group calls are becoming increasingly popular because they allow a subscriber to converse with numerous other subscribers in the same session. This provides particular utility in both business applications and for social communications. However, there are aspects in the way dispatch group calls are conducted today that may not be desirable in all circumstances.

One such aspect is that currently dispatch group calls are generally conducted between group members for groups that are pre-defined prior to the calls. For example, if a business person regularly needs to communicate with certain other people in the business, the person can define a group to include these other people. The business person must notify the network operator of the desire to create a group, and the network operator provisions a single group identifier in the network. Once the group identifier is provisioned, the single group identifier can be used to initiate the call and all members defined as part of the group are automatically connected into the group call if they are available, e.g., their phone is turned on and they are not utilizing the phone to communicate with someone else. Therefore, in a group call with a pre-defined group, while having significant utility, the group must be defined prior to the call and provisioned by the network operator, thus, reducing some of the flexibility for defining the group that may be desired in certain circumstances.

Another current method of establishing a group call that may have potential drawbacks in particular circumstances is to dynamically establish the group for the call. In this method, the group is not required to be pre-defined, as discussed above, but rather, the group members are selected by the initiator of the group call in conjunction with establishing the group call. This methodology may be referred to as a selective dynamic group call, because the group members are selectively defined by the call initiator and also are dynamically defined, i.e., not pre-defined.

Selective Dynamic Group Call (SDGC) is a dispatch call type that allows an originator of a group call to select individual targets to include in the group call. After the originator selects the targets for the call, the dispatch station requests a dedicated control channel (DCCH) to send the call request and the list of targets to a dispatch processor, e.g., a dispatch application processor (DAP). The DCCH is dynamically converted to a traffic channel (TCH) for the purpose of an SDGC call.

The dispatch processor will validate the request and partially validate the targets. Also, the dispatch processor will locate the serving dispatch processor of each of the targets, although the location of the serving dispatch processor of each target is not required in order to start paging. Each target will be individually paged. For targets whose information resides in a Dispatch Visitor Location Register (D-VLR), the dispatch processor will page those individuals. For targets served by other local dispatch processors, the dispatch processor will reserve resources for those targets and page them. For targets served by dispatch processors in other Urban Areas, the originator's dispatch processor (the Master Controlling dispatch processor (MC-DAP)) will select a single dispatch processor in each target Urban Area (the Slave Controlling dispatch processor (SC-DAP)) to control the call in that Urban Area. The MC-DAP will send the targets' information and their serving dispatch processor information to the SC-DAPs. The SC-DAPs will reserve resources for the targets from the serving dispatch processors in the target Urban Area (as necessary) and then page those targets. The SDGC call will be started when the MC-DAP receives the first page response from any of the targets.

Whereas the selective dynamic group call can provide further flexibility over the pre-defined group call, this type of group call may also have limitations in certain circumstances. With both the pre-defined group call and the selective dynamic group call, members of the called group, if they are available for the group call, are automatically included as participants in the group call. Since they are members of the group, when the group call is initiated, they receive the dispatch audio communication from the group call initiator (commonly referred to as "forced-audio"). In selective dynamic group calls, however, if a member of a called group is already on a first group call when a second group call is received, the member might not become part of the second group call. This may be particularly problematic for emergency and public safety personnel, due to the urgency of their calls.

Therefore, it would be desirable to provide an improved multi-party dispatch call capability. The improved capability could provide for a precedence order to allow a member of a current group call to automatically become a member of a new group call having a higher precedence than the current group call.

SUMMARY OF THE INVENTION

In accordance with an embodiment of a method of the present invention, a method for precedence group calling is provided. The method includes the acts of automatically switching from a current group call to a received group call, if a group call identifier of the originator of the received group call has a higher precedence than the group call identifier of an originator of the current group call.

Other objects, advantages, and novel features of the present invention will become apparent from the following detailed description of the invention when considered in conjunction with the accompanying drawings.

DETAILED DESCRIPTION OF THE EXEMPLARY EMBODIMENTS

Figure 1:
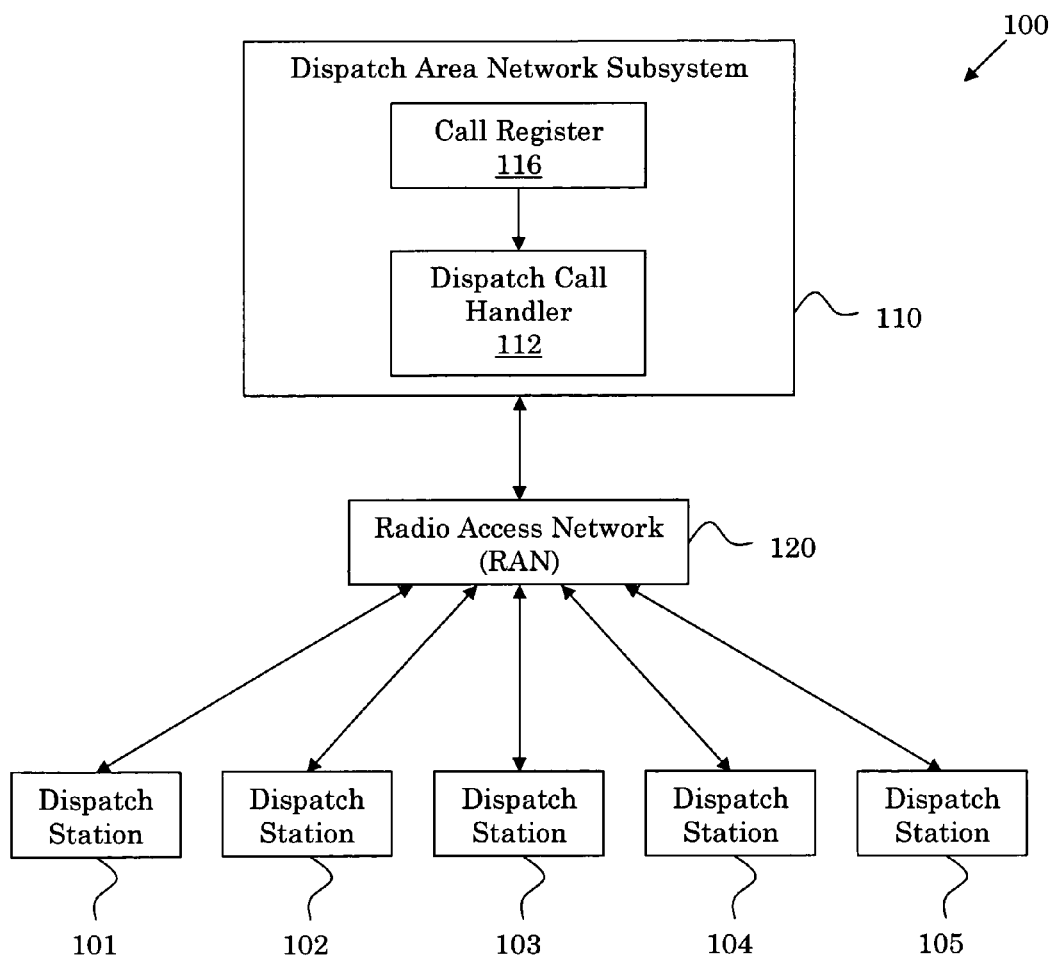
FIG. 1 illustrates an exemplary embodiment of a system for group calling, in accordance with the present invention.

FIG. 1 illustrates an exemplary communication network 100, which supports talk group dispatch communications, in accordance with one embodiment of the present invention. The network 100 includes a dispatch area network subsystem 110, a radio access network (RAN) 120, and a number of dispatch stations 101-105. The dispatch stations have interconnect capabilities and may be a phone, PDA, laptop computer, etc. A dispatch area is a geographic area which includes two or more cells that share network subsystems, such as mobile switching centers (MSCs) and location registers. The dispatch area network subsystem 110 includes a dispatch call handler 112 and a call register 116. The call register 116 generally operates in a similar manner to a location register and performs the functions of a home location register (HLR) to register and authenticate the user. Each dispatch call handler generally operates in a similar manner to a mobile switching center/visitor location register (MSC/VLR) or dispatch application processor (DAP).

As described in more detail below, in accordance with the principles of the present invention, a multi-party dispatch communication session may be conducted as a selective dynamic group call, which includes a plurality of dispatch stations 101-105 communicating through a dispatch network.

Figure 2:
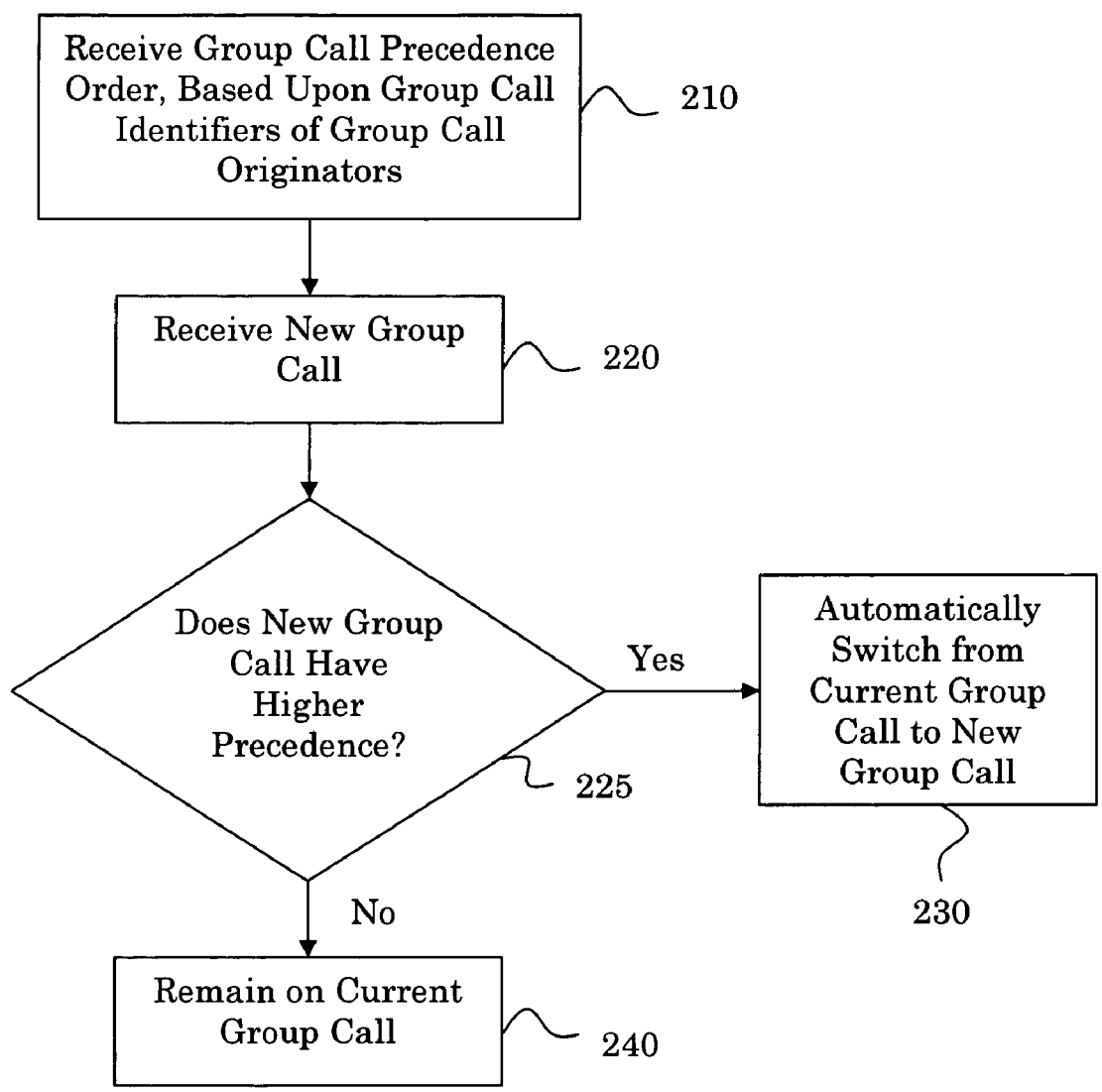
FIG. 2 illustrates an exemplary embodiment of a method for precedence group calling, in accordance with the present invention.

FIG. 2 illustrates an exemplary embodiment of a method in accordance with the present invention. In step 210, a dispatch station receives a group call precedence order, based upon group call identifiers of each of a plurality of group call originators. The group call identifier may be an Urban Fleet Member Identifier (UFMI) or an automatic number identification (ANI), for example, and can be the group call originator's dispatch station identifier. The user may enter the group call precedence order by entering appropriate data via a user interface on the dispatch station, for example. In other words, the precedence order may be defined based upon inputs received from the dispatch station. Alternatively, the user may obtain the assistance of customer service personnel to establish his group calling precedence order.

If a user receives a group call (step 220) during a time when his dispatch station is powered up, but not in use on another group call, the received group call will be processed as usual, i.e., the dispatch station will join the received group call. If the user is already on a current group call when a new group call is received, a decision is made in step 225 of whether the new group call has a higher precedence than the current group call. This decision can be made by the dispatch station, dispatch call handler and/or any other network element. The dispatch call handler would be aware of when a dispatch station is busy. If the dispatch station is busy, the dispatch call handler may page the dispatch station through its call control procedures to inform the dispatch station of the new call.

The user's dispatch station will automatically be switched from the current group call to the new group call in step 230, if the new group call has a higher precedence than the current group call. If the new group call's precedence is not higher than that of the current group call, then the user will remain on the current group call in step 240. Also, if the user is on a packet data call when the new group call is received, the same process will occur for switching to the new group call as described above.

In an exemplary embodiment of the method according to the present invention, a receiver, e.g., a dispatch station, may be notified that the (previously) current group call has been switched to the new group call.

In an alternative embodiment of a method according to the present invention, the user may receive a notification of the higher precedence of a new group call and have the option whether to join the new group call.

In another exemplary embodiment of the present invention, there is a computer-readable medium encoded with a computer program for precedence group calling in a dispatch station. The term "computer-readable medium" as used herein refers to any medium that participates in providing instructions for execution. Such a medium may take many forms, including but not limited to, non-volatile media, volatile media, and transmission media. Non-volatile media includes, for example, optical or magnetic disks. Volatile media includes, for example, dynamic memory. Transmission media includes coaxial cables, copper wire and fiber optics. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, an EPROM, a FLASH-EPROM, any other memory chip or cartridge, a carrier wave, or any other medium from which a computer can read.

An exemplary embodiment of a computer-readable medium encoded with a computer program for precedence group calling in a dispatch station is illustrated in FIG. 2, which is described above.

While the invention has been described in connection with various embodiments, it will be understood that the invention is capable of further modifications. This application is intended to cover any variations, uses or adaptation of the invention following, in general, the principles of the invention, and including such departures from the present disclosure as, within the known and customary practice within the art to which the invention pertains.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for precedence group calling in a dispatch station, the method comprising the acts of:
    providing to a memory of the dispatch station a precedence order for each of a plurality of group call originators, based upon a group call identifier of each of the plurality of group call originators;
    receiving at the dispatch station a group call from one of the plurality of group call originators; and
    automatically switching the dispatch station from a current group call to the received group call, if the dispatch station determines that the group call identifier of the originator of the received group call has a higher precedence than the group call identifier of an originator of the current group call.

2. The method of claim 1, further comprising the act of:
    notifying a receiver that the current group call has been switched to the received group call.

3. The method of claim 1, further comprising the act of:
defining the precedence order based upon inputs received from a user interface of the dispatch station.

4. The method of claim 1, wherein the group call identifier comprises an urban fleet member identifier.

5. The method of claim 1, wherein the group call identifier comprises an automatic number identification.

6. The method of claim 1, further comprising the act of:
remaining on the current group call, if the group call identifier of the originator of the current group call has a higher precedence than the group call identifier of the originator of the received group call.

7. The method of claim 1, wherein the group call is a selective dynamic group call.

8. A method for precedence group calling in a dispatch station, the method comprising the acts of:
providing to a memory of the dispatch station a precedence order for each of a plurality of group call originators, based upon a group call identifier of each of the plurality of group call originators;
receiving at the dispatch station a group call from one of the plurality of group call originators; and
automatically switching the dispatch station from a current packet data call to the received group call, if the dispatch station determines that the group call identifier of the originator of the received group call has a higher precedence than the current packet data call.

9. The method of claim 8, further comprising the act of:
notifying a receiver that the current group call has been switched to the received group call.

10. The method of claim 8, further comprising the act of:
defining the precedence order based upon inputs received from a user interface of the dispatch station.

11. The method of claim 8, wherein the group call identifier comprises an urban fleet member identifier.

12. The method of claim 8, wherein the group call identifier comprises an automatic number identification.

13. The method of claim 8, further comprising the act of:
remaining on the current packet data call, if the current packet data call has a higher precedence than the group call identifier of the originator of the received group call.

14. The method of claim 8, wherein the group call is a selective dynamic group call.

15. A non-transitory computer-readable medium encoded with a computer program for precedence group calling in a dispatch station, the computer program comprising instructions for:
receiving, in the dispatch station, a precedence order for each of a plurality of group call originators, based upon a group call identifier of each of the plurality of group call originators;
receiving, in the dispatch station, a group call from one of the plurality of group call originators; and
automatically switching the dispatch station from a current group call to the received group call, if the dispatch station determines that the group call identifier of the originator of the received group call has a higher precedence than the group call identifier of an originator of the current group call.

16. The computer-readable medium of claim 15, further comprising instructions for:
notifying a receiver that the current group call has been switched to the received group call.

17. The computer-readable medium of claim 15, further comprising instructions for:
defining the precedence order based upon inputs received from a user interface of the dispatch station.

18. The computer-readable medium of claim 15, wherein the group call identifier comprises an urban fleet member identifier.

19. The computer-readable medium of claim 15, wherein the group call identifier comprises an automatic number identification.

20. The computer-readable medium of claim 15, further comprising instructions for:
remaining on the current group call, if the group call identifier of the originator of the current group call has a higher precedence than the group call identifier of the originator of the received group call.

21. The computer-readable medium of claim 15, wherein the group call is a selective dynamic group call.

22. A non-transitory computer-readable medium encoded with a computer program for precedence group calling in a dispatch station, the computer program comprising instructions for:
receiving, in the dispatch station, a precedence order for each of a plurality of group call originators, based upon a group call identifier of each of the plurality of group call originators;
receiving, in the dispatch station, a group call from one of the plurality of group call originators; and
automatically switching the dispatch station from a current packet data call to the received group call, if the dispatch station determines that the group call identifier of the originator of the received group call has a higher precedence than the group call identifier of the originator of the current packet data call.

23. The computer-readable medium of claim 22, further comprising instructions for:
notifying a receiver that the current group call has been switched to the received group call.

24. The computer-readable medium of claim 22, further comprising instructions for:
defining the precedence order based upon inputs received from a user interface of the dispatch station.

25. The computer-readable medium of claim 22, wherein the group call is a selective dynamic group call.

\* \* \* \* \*